United States Patent [19]
Pachaly

[11] 3,789,112
[45] Jan. 29, 1974

[54] PROCESS FOR OBTAINING DEUTERIUM FROM HYDROGEN-CONTAINING COMPONENTS AND THE PRODUCTION OF HEAVY WATER THEREFROM

[75] Inventor: Robert W. Pachaly, Pittsburgh, Pa.

[73] Assignee: Gulf Research & Development Company, Pittsburgh, Pa.

[22] Filed: Oct. 28, 1970

[21] Appl. No.: 84,578

[52] U.S. Cl. .................. 423/580, 423/648
[51] Int. Cl. .................. C01b 5/02, C01b 4/00
[58] Field of Search 23/204 C, 204 P, 204 R, 212 R, 23/210 I; 423/580, 648

[56] References Cited
UNITED STATES PATENTS
2,787,526 4/1957 Spevack ........................ 23/204 R
2,908,554 10/1959 Hoogschagen ................ 23/204 R
2,690,381 9/1954 Taylor .......................... 23/212 R

*Primary Examiner*—Oscar R. Vertiz
*Assistant Examiner*—Hoke S. Miller
*Attorney, Agent, or Firm*—Meyer Neishloss; Thomas G. Ryder; Deane E. Keith

[57] ABSTRACT

The deuterium naturally present in the chemical compounds is transferred to hydrogen having less than normal deuterium content after which the deuterium is recovered from the hydrogen and the recovered deuterium can be oxidized to form deuterium oxide or heavy water.

14 Claims, 2 Drawing Figures

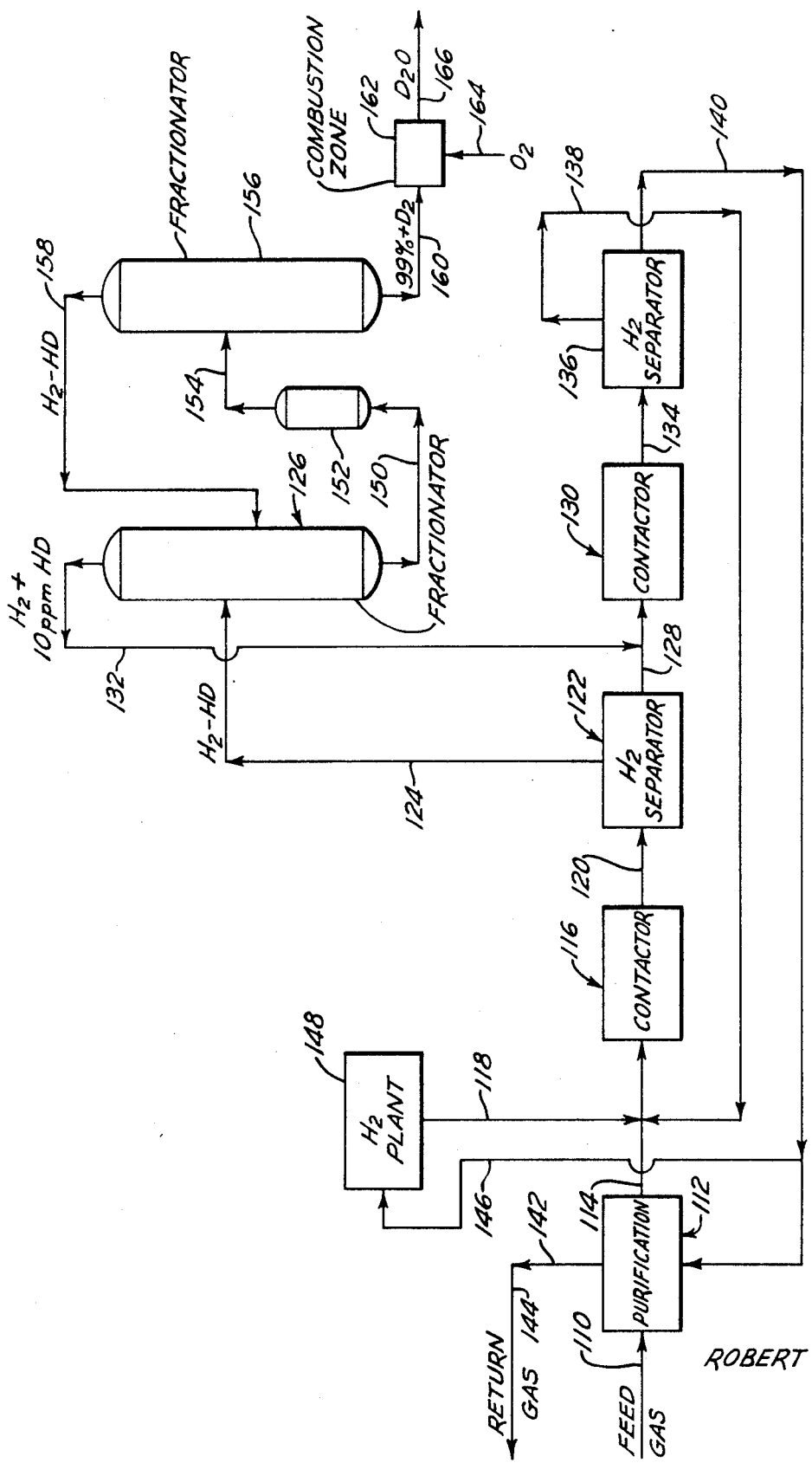

PROCESS FOR OBTAINING DEUTERIUM FROM HYDROGEN-CONTAINING COMPONENTS AND THE PRODUCTION OF HEAVY WATER THEREFROM

My invention relates to a process for the recovery of deuterium from chemical compounds rich in hydrogen such as methane, natural gas, other light hydrocarbons, ammonia, alcohols, etc., and the production of heavy water, i.e., deuterium oxide ($D_2O$), from such recovered deuterium. More specifically, my invention relates to a process wherein the deuterium in methane or natural gas is transferred to a hydrogen stream having less than the normal concentration of deuterium and thereafter recovering the deuterium from such hydrogen stream.

In addition to its utility as a tracer in biological and chemical processes and other laboratory employments, the hydrogen isotope of mass 2, designated as deuterium, has recognized nuclear properties favoring the employment of deuterium in the form of deuterium oxide or heavy water ($D_2O$) as a moderator for nuclear reactors. Deuterium is also a future potential fuel for a fusion type nuclear reactor now under development. In the past, however, the art has been confronted with the problem of producing deuterium or heavy water economically in sufficiently high concentrations and in adequate quantities. This is due to the fact that the normal concentration of deuterium in hydrogen or hydrogen-containing materials is extremely low. Thus, molecular deuterium occurs in natural hydrogen, water and other hydrogen-bearing compounds in an average abundance in the range from about 0.010 to about 0.016 mole percent relative to the molecular hydrogen content of the material. On the other hand, however, "reactor-grade" heavy water requires a concentration above 99 percent $D_2O$. While in the past various techniques have been suggested for the enrichment of the deuterium oxide content in water or the isolation or separation of deuterium from hydrogen or hydrogen-containing materials, such processes have shown severe shortcomings when it has been attempted to apply them to a commercial scale. Usually such processes require the treatment of extremely large quantities of materials and/or have resulted in extremely high costs due to excessive equipment and power requirements, coupled with a low processing efficiency reflected in recoveries of only about 20 percent of the deuterium content of the stream. These previously suggested techniques have included electrolysis of water, vacuum distillation of water and chemical exchange processes requiring deuterium exchange from one hydrogen-containing compound to another, such as, for example, the $H_2S/H_2O$, $H_2/H_2O$ and $NH_3/H_2$ exchanges.

To illustrate the magnitude of the operation required, it has been estimated that an inventory of about one ton of $D_2O$ would be required for each megawatt of electrical energy output from a nuclear power plant and that a plant in the range from about 300 to about 500 megawatts would be required for an economic operation while 1000 to 10,000 megawatt plants have been projected. Similarly, it has been estimated that only about 25 tons of $D_2O$ per year might be produced from the deuterium that could be separated from 50 tons of hydrogen per day. Assuming a normal operation of approximately 330 days per year, these figures would then indicate that 660 tons of hydrogen would have to be treated for each ton of $D_2O$ produced and that to provide the inventory of $D_2O$ required for a 300 megawatt nuclear power plant would require processing approximately 198,000 tons of hydrogen. To express it another way, it would require processing about 100,000,000 cubic feet per day of pure hydrogen to obtain about 100 tons per year of heavy water. Obviously then, techniques of this type would require the heavy water plant to be parasitic to hydrogen production facilities of almost astronomical magnitude.

Thus, while it is technically possible to obtain deuterium by separation of the natural abundance thereof from hydrogen by fractionation or distillation, such technique is not feasible from a commercial standpoint due to the fact that in a single plant operation the production in one location of the vast quantity of hydrogen required would necessitate the employment of hydrogen production facilities of a magnitude that is impracticable, not to mention the size of the deuterium separation facility that would also be required. Such an operation would be well nigh impossible. On the other hand, the employment of a multiplicity of comparatively smaller plants at different locations, while being more compatible with present technology, still presents an infeasible scheme since such would result in obtaining portions of the desired product in diverse locations and still require production of hydrogen in quantities far in excess of current demands for hydrogen in single locations. This would result in substantial portions of the hydrogen production costs to be borne solely by the deuterium separation operation, thereby making the cost of deuterium production prohibitive. Similarly, it should be noted that in most existing commercial hydrogen plants, wherein the hydrogen is primarily produced for utilization in other commercial processes and the cost of hydrogen production is therefore borne by such other processes, the quantity of hydrogen produced is insufficient to provide a sufficiently large quantity of deuterium to warrant recovery thereof.

Accordingly, the source of deuterium for any commercial operation must be material which is readily available in large quantities and available at a minimal cost. Exemplary of such a material is water. In this connection, however, it is noted that in the U. S. Atomic Energy Commission plant at Savannah River, wherein water is employed as the basic source of deuterium, the required sequence of $H_2S/H_2O$ transfer followed by vacuum distillation and finally electrolytic processing to produce $D_2O$ of 99 percent plus purity still results in a product having a subsidized market price of over $28 per pound.

Another material which is readily available in many areas of the world in large quantities which also represents a good source of deuterium is natural gas containing low molecular weight hydrocarbons such as, for example, materials containing up to about six carbon atoms. Particularly advantageous as a source of deuterium is methane which contains four hydrogen atoms per molecule as compared to the two hydrogen atoms per molecule of water. Thus, on a theoretical consideration methane should contain approximately twice the amount of deuterium per molecule as does water. Attempting the upgrading of the deuterium content of methane via a technique such as distillation again provides a technique which, while apparently technically possible, is commercially infeasible due to the tremendous quantities of equipment and power needed to obtain a slight enhancement in dueterium content. Thus, while methane or natural gas can be an inexpensive raw materiad for the production of deuterium or heavy water, the cost of processing by the techniques previously suggested by the art have militated against any attempt to recover deuterium from natural gas or methane.

I have discovered a process whereby deuterium in high concentration can be recovered from relatively hydrogen-rich source material through a simple, economic process requiring comparatively low capital investment in equipment. Further, I have discovered that such deuterium can be converted simply and efficiently into heavy water of greater than 99 percent plus purity. The relatively hydrogen-rich source material employed as the charge stock in my invention can be any material in which the ratio of hydrogen atoms to all other atoms is at least 2:1 and preferably in which the ratio is 3:1 or greater. Accordingly, the charge stock employed can be comprised of substantially a single compound, such as, for example, methane, ammonia or an alcohol, or it can be comprised of a mixture or blend of different compounds, such as, for example, a natural gas stream or a liquefied petroleum gas stream.

In accordance with my invention a deuterium-containing relatively hydrogen-rich source material is contacted with hydrogen from which the deuterium normally present therein has been removed or at least substantially reduced. Preferably such hydrogen is substantially deuterium-free, i.e., hydrogen rather than the normal mixture of hydrogen and HD having a deuterium concentration of about 0.015 mole percent deuterium ($D_2$). This contacting is effected while in the presence of and in contact with a hydrogenation-dehydrogenation catalyst at an elevated temperature, e.g., greater than about 250° or 300° F., thereby effecting a transfer of deuterium from the source material to the hydrogen, to produce a mixture of deuterium-enriched hydrogen (HD and $H_2$) and deuterium-lean source material. As employed in the specification and claims hereof, the term "deuterium-enriched hydrogen" means hydrogen into which deuterium has been transferred thereby increasing the deuterium content of the hydrogen to a level greater than that prior to the transfer, regardless of whether the deuterium content of the "enriched" hydrogen is even equal to, much less greater than, the normal abundance of deuterium in hydrogen. Conversely, the term "deuterium-lean" means a material, such as methane or other source material, from which deuterium has been transferred thereby decreasing the deuterium content of the material from the level of deuterium content prior to the transfer, regardless of whether the material initially contained a normal abundance of deuterium or had previously been subjected to a transfer reaction for the removal of deuterium.

The mixture of deuterium-enriched hydrogen and dueterium-lean source material is removed from contact with the catalyst before cooling so as to prevent reversal of the equilibrium deuterium transfer reaction. The deuterium-enriched hydrogen is then separated from the deuterium-lean source material. This separated deuterium-enriched hydrogen is subjected to a first fractionation, e.g., cryogenic fractional distillation, so as to provide a hydrogen fraction containing substantially less than the normal concentration of deuterium and a fraction of super-enriched deuterium content (substantially HD). The super-enriched deuterium fraction is then contacted with a catalyst effective to equilibrate such fraction so that the composition of the equilibrated fraction approaches the equilibrium concentrations of 25 percent $H_2$, 50 percent HD and 25 percent $D_2$. This equilibrated, super-enriched fraction is next subjected to a second fractionation, e.g., cryogenic fractional distillation, to provide a second deuterium-enriched hydrogen fraction (HD and $H_2$) and a high-purity (99%+) deuterium fraction ($D_2$). The high-purity deuterium fraction is recovered and the second deuterium-enriched hydrogen fraction can be recycled to the first fractionation step.

The hydrogen fraction of reduced deuterium content, preferably deuterium-free, obtained from the first fractionation step is then recycled to the contacting step to be contacted with the deuterium-containing source material. Thus, the hydrogen of reduced deuterium content, it will be seen, is produced in the operating sequence of my invention. It will also be understood that the deuterium-lean source material separated from the deuterium-rich hydrogen stream in the separation step described above can be removed from the system and returned to storage or pipeline for later utilization in any operation or processing wherein such material would normally be employed.

The charge stock employed in my invention advantageously is a material which is in the vapor phase at the operating conditions utilized during contacting with the hydrogen and catalyst. Thus, although any material which is relatively rich in hydrogen and easily vaporized at operating conditions is satisfactory, I prefer to employ light hydrocarbons containing up to about six carbon atoms. Particularly preferred charge stocks include methane, ethane and propane. It should also be pointed out that non-hydrocarbon materials relatively rich in hydrogen, e.g., ammonia, are satisfactory charge stocks.

Advantageously, the charge stock employed in my invention is subjected to a purification treatment prior to the initial contacting of charge stock and hydrogen. Such purification treatment is effective to remove some of the minor contaminants from charge stocks, such as, for example, the water, hydrogen sulfide, carbon dioxide, small quantities of heavy hydrocarbons, etc., which might be present in natural gas or entrained in methane and which materials might have an adverse affect upon the catalysts employed in my process or whose presence might be undesirable in cryogenic processing due to the fact that they might solidify at the low temperatures required. This purification can be effected using any of the various techniques well known in the art, such as, for example, by contacting the raw feed with an adsorbent material, e.g., charcoal, alumina, molecular sieves, etc., or by specialized low-temperature separations. Undesired contaminants can also be removed by absorption with an organic solvent, amine, methanol, sulfolane, etc.

In the step of contacting the deuterium-containing relatively hydrogen-rich source material with the hydrogen of reduced deuterium content the catalyst employed can be any of the well-known hydrogenation-dehydrogenation catalysts, including, for example, alumina, Group VI and VIII metals and their oxides, either alone or supported on carriers, such as alumina, and catalysts such as silica or silica-alumina. I prefer, however, to employ alumina (particularly high-purity alumina), and Group VIII metals, specifically Group VIII noble metals, such as platinum and palladium and particularly platinum.

In effecting the contacting of the deuterium-containing source material, hydrogen of reduced deuterium content and catalyst, the temperature employed is an elevated temperature ranging from about a few hundred degrees Fahrenheit above room temperature up to the thermal breakdown temperature of the material being processed. Generally, the temperature is maintained in the range from about 400° to about 1800° F. and preferably in the range from about 600° to about 1500° F. More preferred temperatures are in the range from about 800° to about 1200° F. When charging a hydrocarbon source material, the higher temperatures of the above ranges are associated with the processing of lower molecular weight materials. The pressures utilized during such contacting can range from atmospheric pressure up to about 10,000 psia and preferably are maintained in a range from about 50 to about 5000 psia. Usually, however, the maximum pressure employed will not be greater than about 3000 psia, with pressures lower than 1000 psia not only being satisfactory but pressures below about 500 psia being desirable. Advantageously, the pressure maintained during contacting is at least about 150 psia. This is particularly so when the deuterium-enriched hydrogen is to be subjected to a cryogenic fractional distillation since it is desirable to operate the fractionator at a temperature near the critical temperature of hydrogen which in turn requires a minimum pressure of about 125 psia at the top of the fractionator in order to maintain a liquid phase in the bottom of the fractionator. Thus, a pressure of 150 psia or greater in the contacting step makes allowance for a pressure drop through the system and still provides a pressure of 125 psia in the fractionator without requiring compression of the deuterium-enriched hydrogen.

The feed rate of the charge stock, in the vapor phase, plus deuterium-lean hydrogen is to be in the range from about 1000 to about 100,000 standard volumes of gas per hour per volume of catalyst and preferably is maintained in the range from about 4000 to about 50,000 volumes of gas per hour per volume of catalyst. More preferred feed rates are in the range from about 6000 to about 20,000 standard volumes of gas per hour per volume of catalyst. In operating this contacting step the volume ratio of hydrogen to charge gas is in the range from about 5:1 to about 0.5:1 and preferably from about 2:1 to about 1:1.

While it is important to maintain operating conditions during contacting within the above ranges so as not to hinder the deuterium transfer and to permit ready integration of the contacting step into the balance of the process scheme, the operating condition which has the greatest effect upon the deuterium transfer effected during such contacting is temperature. This is due to the fact that the effectiveness of the deuterium transfer is dependent upon equilibrium, which varies with temperature. The remaining operating conditions employed during contacting have either a more limited or no effect upon the deuterium transfer.

After contacting of the hydrogen stream of reduced deuterium content, the deuterium-containing charge gas and the catalyst to provide a deuterium-enriched hydrogen stream and a deuterium-lean gaseous source material stream, the resultant hydrogen and source material mixture is removed from contact with the catalyst before permitting any reduction in temperature of the mixture. The hydrogen stream is then separated from the gaseous source material stream. This can be accomplished quite readily by various techniques known to the art such as, for example, contacting a hydrogen and hydrocarbon stream with a bed of selectively adsorbent material, as well as by low temperature (cryogenic) fractionation or low temperature flashing. These latter methods are quite suitable for the separation of hydrogen and hydrocarbon due to the substantial differences in boiling points of hydrogen and hydrocarbons (BP: $H_2$ about $-253°C$.; $CH_4$ about $-162°C$.).

In the fractionation of the deuterium-enriched hydrogen stream a cryogenic fractional distillation can be employed and a separation of the hydrogen from its other isotopes effected readily due to the differences in vapor pressure existing between such isotopes. In this first fractionation of my invention I effect a separation substantially between hydrogen on the one hand and HD on the other hand. While, advantageously, such separation will permit removal of substantially pure hydrogen overhead, such an exact separation is not essential and a hydrogen stream which has been stripped so that is contains up to about 30 to 50 ppm HD has been found to be satisfactory. Preferably, however, the separated hydrogen contains no more than about 10 ppm HD. This low concentration of HD in the separated hydrogen or hydrogen of reduced deuterium content advantageously provides an additional driving force in the desired direction of transfer based upon equilibrium considerations.

The superenriched deuterium fraction from which the substantially deuterium-free hydrogen has been separated will usually consist of about 95 percent HD with the balance being a certain amount of hydrogen as well as some $D_2$. The temperatures employed in the cryogenic fractionation to separate the substantially deuterium-free hydrogen from the superenriched HD fraction are generally in the range from about $-430°$ F. up to about $-400°F$. The pressure employed can be any pressure which, at the particular temperature being employed, will permit formation, and thus separation, of the desired superenriched deuterium liquid phase and the substantially deuterium-free hydrogen vapor phase. Such pressure includes both subatmospheric and superatmospheric pressures. Usually, however, I prefer to employ pressures in the range from about 125 psia up to about 500 psia.

Inasmuch as $H_2$, HD and $D_2$ tend not to achieve a favorable equilibrium at such extremely low temperatures, the superenriched deuterium from the first fractionation step is then brought to a higher temperature, usually about room temperature or above, e.g., up to about 300° F., and contacted with a catalyst effective to equilibrate the substantially HD stream at such temperature. Suitable catalytic materials include, for example, iron hydroxide, iron synthetic ammonia catalyst, alumina, platinum, iron, nickel or supported metal catalysts including platinum, iron, nickel, etc. supported on carriers such as alumina or kieselguhr. The result of such equilibration is to convert the stream which is substantially HD into a form more closely approaching normal equilibrium of the various isotopes such that the equilibrated stream is composed substantially of 25 percent $H_2$, 50 percent HD and 25 percent $D_2$.

This equilibrated stream is then cooled and subjected to a second cryogenic fractional distillation and this time is cut so as to separate as an overhead fraction the hydrogen and HD components from the remaining $D_2$ components. This fractionation provides a substantially pure $D_2$ stream composed of 99%+ $D_2$, e.g., 99.9 percent.

The temperature employed in this second cryogenic fractionation is in about the same range as employed in the first cryogenic fractionation mentioned above. Similarly, the pressure employed is within the same range as for the first cryogenic fractionation. I prefer, however, to employ a temperature in the second cryogenic fractionation which is higher than employed in the first fractionation, albeit only slightly higher. Usually, the temperature of the second fractionation is maintained about 2 or 3° higher than the temperature employed in the first fractionation. I also prefer to employ a pressure in the second fractionation which is about 20 to 30 psi greater than the pressure employed in the first fractionation.

In order to define my invention in greater detail, reference is made to the drawings wherein:

FIG. 2 is a schematic flow diagram of a preferred embodiment of my invention.

Figure 1:
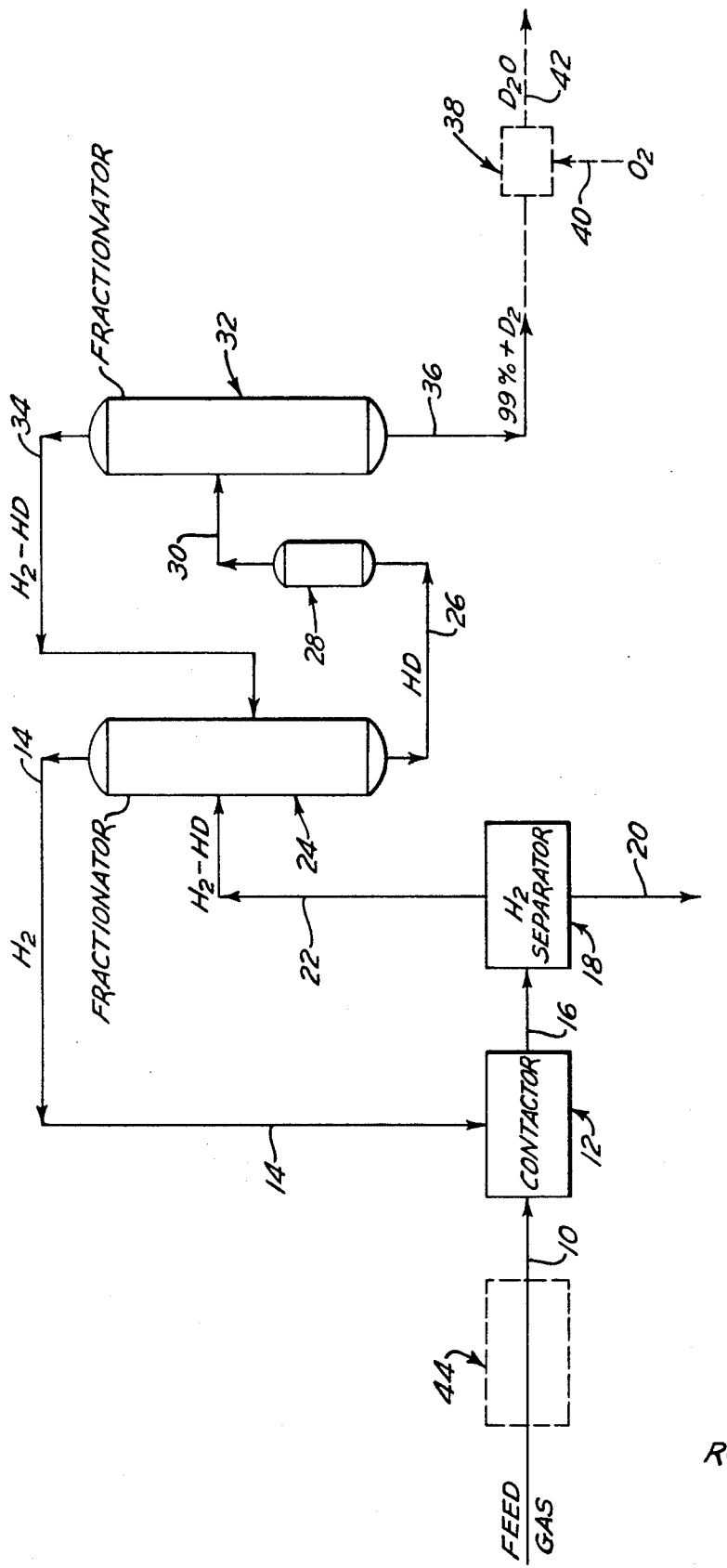
FIG. 1 is a schematic flow diagram of the basic process of my invention.

It will be understood that these drawings have been greatly simplified so that various pumps, compressors, heat exchange means, and the like, have not been shown for the sake of simplicity.

Referring now to FIG. 1, the feed gas, such as natural gas or methane, with its normal abundance of deuterium, is passed by means of line 10 and introduced into contactor 12 wherein is located a bed of a hydrogenation-dehydrogenation catalyst such as, for example, alumina, platinum or platinum on alumina. Substantially deuterium-free hydrogen obtained by stripping deuterium from hydrogen elsewhere in the process is also introduced into contactor 12 by means of line 14. A temperature in the range from about 500° to about 1600° F., preferably above 700° F., is maintained in contactor 12. The pressure in contactor 12 is maintained at a level below about 400 psia, and preferably below about 300 psia but above about 100 psia. The result of this contacting in contactor 12 is to transfer the deuterium from the feed gas of line 10 to the hydrogen stream of line 14. While maintaining this elevated temperature, a combined effluent stream is removed from contactor 12 by mean of line 16, and thereafter cooled and passed to hydrogen separator 18.

In hydrogen separator 18 the combined stream is further reduced in temperature so as to effect a separation of hydrogen and its isotopes from the feed gas, e.g., methane or natural gas. The separated feed gas is taken from separator 18 by means of line 20 and removed from the system. The stream of hydrocarbon gas of line 20 can be returned to the source of the feed gas, e.g., storage or pipeline, or can be utilized in other processes.

The stream of hydrogen and its isotopes, now in the form of a combined hydrogen and HD stream is removed from separator 18 by means of line 22 and passed to fractionator 24 wherein the combined $H_2$—HD stream is subjected to cryogenic fractional distillation. This fractionation is conducted so as to provide a substantially complete separation of hydrogen from deuterium-containing molecules resulting in the production of a substantially deuterium-free hydrogen fraction which is removed overhead by means of line 14 and recycled to contactor 12 described previously. The remaining fraction comprising substantially HD is then removed from fractionator 24 by means of line 26 and passed to equilibration reactor 28.

As mentioned previously, the various isotopes of hydrogen tend not to achieve a favorable equilibrium at the low temperatures existing in fractionator 24 and required for the cryogenic fractional distillation. Accordingly, the substantially HD stream of line 26 is warmed and contacted with a catalyst effective to cause equilibration of the various hydrogen isotopes at temperatures such as, for example, room temperature up to about 300° F. The contacting of the HD stream of line 26 with the equilibration catalyst in reactor 28 results in the production of an isotopic mixture approximating the equilibrium distribution of about 25 percent $H_2$, 50 percent HD and 25 percent $D_2$. This equilibrated stream is then removed from reactor 28 by means of line 30, cooled and passed to a second fractionator 32.

In fractionator 32 the equilibrated stream of line 30 is subjected to a cryogenic distillation quite similar to that employed in fractionator 24 but operated at a slightly higher temperature and preferably at a slightly higher pressure so as to effect a split between a combined $H_2$ and HD fraction and a substantially pure $D_2$ fraction. The $H_2$-HD fraction is removed overhead from fractionator 32 by means of line 34 and recycled to fractionator 24. The substantially pure, e.g., 99%+ $D_2$ fraction is removed from fractionator 32 by means of line 36. This substantially pure deuterium fraction of line 36 can then be recovered as product.

Additionally, the deuterium fraction of line 36 can be further processed by passing it to a combustion zone 38 wherein it can be combined with a substantially pure oxygen stream introduced by means of line 40 and burned so as to produce heavy water ($D_2O$) after which the heavy water can be removed by means of line 42 and recovered as reactor-grade heavy water.

Advantageously, the raw feed gas of line 10 can be subjected to purification by a cryogenic system or by contacting with an adsorbent material effective to remove contaminants, such as water, carbon monoxide, etc. As illustrated in FIG. 1, the feed gas of line 10 is shown being conducted through a purification zone 44 prior to introduction of the feed gas to contactor 12.

Referring now to FIG. 2 of the drawings which shows a schematic flow diagram of a preferred embodiment of my invention, such flow scheme will be described in conjunction with the following example.

EXAMPLE

A feed gas stream comprising substantially raw methane with its normal abundance of deuterated methane ($CH_3D$, the normally occurring material, assumed to be present in a concentration of approximately 0.06 mol percent) and flowing at the rate of about 400 million standard cubic feet per day (400 MM SCFD) is passed by means of line 110 into a purification unit 112 containing a bed of molecular sieves. This contacting is effective to remove any contaminants from the methane stream which might have an adverse effect on either catalysts or low temperature operating steps employed subsequently. The purified methane stream is now passed by means of line 114 to a first contactor 116. A recycle stream of hydrogen containing less than a normal abundance of deuterium and flowing by means of line 138 at the rate of about 800 MM SCFD is combined with a hydrogen stream of line 118 flowing at the rate of about 0.2 MM SCFD (as make-up to replace $D_2$ and $H_2$ removed from the system) and the methane stream of line 114 prior to its introduction into contactor 116. The ratio of hydrogen to methane is maintained at about a 2:1 volume ratio.

In contactor 116 the combined hydrogen and methane stream is contacted with a high-purity alumina catalyst at a temperature of about 800° to 1200° F., at a pressure of about 130 to 150 psia and at a space velocity of about 20,000 volumes of methane plus hydrogen per volume of catalyst per hour. This contacting is effective to provide a transfer of a substantial quantity of the deuterium initially present in the raw methane stream to the hydrogen stream initially containing less than the normal abundance of deuterium, since the combined methane and hydrogen stream tend to reach an equilibrium distribution of deuterium between the two materials and since the hydrogen stream initially contained less than its normal abundance of deuterium. The deuterium transferred to this hydrogen stream is generally in the form of HD.

Subsequent to the transfer reaction occurring in contactor 116 the combined effluent stream flowing at the rate of about 1200 MM SCFD is removed therefrom by means of line 120, cooled and passed to hydrogen separator 122. In separator 122 a low-temperature separation is readily effected at a temperature of about −300° F. and a pressure of about 130 psia so as to separate hydrogen and its isotopes from methane thereby providing a methane stream containing a reduced quantity of deuterium and a combined $H_2$—HD stream. The $H_2$—HD stream is removed from separator 122 by means of line 124 at a rate of about 800 MM SCFD and passed to cryogenic fractionator 126, while the methane stream is removed from separator 122 at a rate of about 400 MM SCFD and passed by means of line 128 to a second contactor 130.

The $H_2$-HD stream of line 124 is subjected to a cryogenic fractionation in fractionator 126 so as to effect substantially a separation between the $H_2$ and the HD components of such stream. The maintenance of a temperature in fractionator 126 of about −400° F. and a pressure of 125 psia is effective to provide an overhead $H_2$ stream containing no more than about 10 ppm HD. Similarly, the employment of such conditions is effective to provide a fractionator bottoms stream of about 95 percent HD. The hydrogen fraction containing less than 10 ppm HD is then removed overhead from fractionator 126 by means of line 132 at a rate of about 800 MM SCFD and combined with the methane stream of line 128 prior to introduction into contactor 130.

The combined streams of lines 128 and 132 are contacted with a catalyst of high-purity alumina at a temperature of about 800° to 1200° F. and a pressure of about 130 to 150 psia in contactor 130. Again, the ratio of the hydrogen stream of line 132 to the methane stream of line 128 is maintained at about 2:1 and a space velocity of about 20,000 volumes of methane plus hydrogen per volume of catalyst per hour is also maintained in contactor 130. This contacting is effective to provide a further transfer of deuterium from the methane into a hydrogen stream initially containing less than the normal abundance of deuterium. The combined effluent stream from contactor 130 flowing at the rate of about 1200 MM SCFD is then passed by means of line 134 into hydrogen separator 136 maintained at a temperature of about −300° F. and a pressure of about 120 psia whereby a hydrogen stream of enriched deuterium content but generally containing less than normal abundance of deuterium is separated from the now deuterium-lean methane by means of a low temperature separation. The separated hydrogen is removed from separator 136 by means of line 138 at a rate of about 800 MM SCFD and is then combined with the purified raw methane stream of line 114 and the hydrogen stream of line 118 prior to introduction into contactor 116.

The deuterium-lean methane stream separated in separator 136 is removed therefrom by means of line 140 and recycled to purification unit 112 where it is employed to purge the molecular sieve beds. This deuterium-lean methane stream is removed from purification unit 112 by means of line 142 at a rate of about 400 MM SCFD and is returned to the source of the feed gas by means of line 144. When the stream of line 140 is not required for the purging of the molecular sieve beds, it need not be passed through purification unit 112 but can be returned directly to the source of feed gas, by means not shown. A minor portion of the deuterium-lean methane stream of line 140 is passed by means of line 146 to a hydrogen plant 148, such as a stream reforming plant, in order to provide the small quantity of makeup hydrogen required in this embodiment of my invention. It will be understood that since the methane stream charged to the hydrogen plant 148 is substantially deuterium-free methane, the hydrogen produced in hydrogen plant 148 and introduced into the reaction system by means of line 118 will also be substantially deuterium-free.

The HD bottoms fraction from fractionator 126 is removed therefrom by means of line 150 at a rate of about 0.4 MM SCFD and passed to equilibrium reactor 152 wherein the HD stream is contacted with an iron hydroxide catalyst at a temperature of about 250° F. and a pressure of about 200 psia thereby effecting an equilibration of the various hydrogen isotopes in order to provide a substantially equilibrium mixture of isotopic components approaching the equilibrium distribution of 25 percent $H_2$, 50 percent HD and 25 percent $D_2$. This equilibrated stream is then removed from reactor 152 by means of line 154, cooled and passed to fractionator 156 wherein this stream is subjected to a cryogenic fractionation.

Fractionator 156 is operated in substantially the same manner as fractionator 126 employing a temperature of about −400° F. and a pressure of about 150 psia except that in fractionator 156 a slightly higher temperature is used in order to effect a separation into a combined $H_2$-HD fraction and a substantially pure $D_2$ fraction. The $H_2$-HD fraction is removed overhead from fractionator 156 by means of line 158 at a rate of about 0.3 MM SCFD and recycled to fractionator 126 thereby providing for the further separation of the $H_2$ from the HD component in the stream of line 158.

The substantially pure $D_2$ fraction is removed from fractionator 156 by means of line 160 at a rate of about 80,000 SCFD and passed to a combustion zone 162 wherein it is combined with substantially pure oxygen (99%+) also introduced into combustion zone 162 by means of line 164. The result of this combustion of the substantially pure deuterium stream with substantially pure oxygen is the production of reactor-grade heavy water comprising 99%+ $D_2O$ which is removed from combustion zone 162 by means of line 166 at the rate of about 2.1 short tons per day.

In this operation the amount of makeup hydrogen added to the system, such as from hydrogen plant 148 via line 118, is sufficient to compensate for the quantity of deuterium removed from the system as $D_2$, such as via line 160, or as $D_2O$, such as via line 166, together with the small quantity of hydrogen dissolved or entrained in the return gas and thus removed from the system, such as via line 144.

I claim:

1. A process for transferring deuterium from a deuterium-containing relatively hydrogen-rich hydrocarbon source material which is in the vapor phase at the operating conditions utilized during contacting with hydrogen and in which the ratio of hydrogen atoms to all other atoms is at least 2:1, which process comprises contacting the source material with hydrogen of reduced deuterium content and a hydrogenation-dehydrogenation catalyst at a temperature in the range from about 400° to about 1800° F., a pressure from about atmospheric up to about 10,000 psia and a feed rate of hydrogen-rich source material, in the vapor phase, plus hydrogen from about 1,000 to about 100,000 standard volumes of gas per hour per volume of catalyst with the volume ratio of hydrogen to source material being from about 5:1 to about 0.5:1, thereby producing deuterium enriched hydrogen and source material of reduced deuterium content, separating the deuterium-enriched hydrogen from the source material of reduced deuterium content, and then recovering the deuterium-enriched hydrogen.

2. A process for recovering deuterium from a deuterium-containing relatively hydrogen-rich hydrocarbon source material which is in the vapor phase at the operating conditions utilized during contacting with hydrogen and in which the ratio of hydrogen atoms to all other atoms is at least 2:1, which process comprises 1. transferring deuterium from the source material to hydrogen of reduced deuterium content by contacting the source material and hydrogen of reduced deuterium content with a hydrogenation-dehydrogenation catalyst at a temperature in the range from about 400° to about 1800°F., a pressure from about atmospheric up to about 10,000 psia and a feed rate of hydrogen-rich source material, in the vapor phase, plus hydrogen from about 1,000 to about 100,000 standard volumes of gas per hour per volume of catalyst with the volume ratio of hydrogen to source material being from about 5:1 to about 0.5:1, thereby producing deuterium-enriched hydrogen and source material of reduced deuterium content, 2. separating the deuterium-enriched hydrogen from the source material of reduced deuterium content, 3. subjecting the deuterium-enriched hydrogen to a first fractionation to provide a superenriched deuterium fraction and a hydrogen fraction of reduced deuterium content, 4. contacting the superenriched deuterium fraction with a catalyst effective to equilibrate the superenriched deuterium fraction at a temperature from about room temperature up to about 300°F., 5. subjecting the equilibrated, superenriched deuterium fraction to a second fractionation to provide a deuterium-enriched hydrogen fraction and a substantially pure deuterium fraction, and 6. recovering the substantially pure deuterium fraction from step 5 as product.

3. The process of claim 2 wherein the deuterium-enriched hydrogen fraction from step (5) is recycled to the first fractionation of step (3).

4. The process of claim 2 wherein the hydrogen fraction of reduced deuterium content from step (3) is recycled to the contacting of step (1).

5. The process of claim 2 wherein the hydrogen of reduced deuterium content is substantially deuterium-free.

6. The process of claim 2 wherein the source material is natural gas.

7. The process of claim 2 wherein the source material is a lower boiling hydrocarbon containing less than about six carbon atoms.

8. The process of claim 2 wherein the source material is methane.

9. The process of claim 2 wherein the source material is subjected to a purification treatment prior to the contacting of step (1).

10. A process for obtaining deuterium from a stream of deuterium containing hydrogen-rich hydrocarbon source material which is in the vapor phase at the operating conditions utilized during contacting with hydrogen and in which the ratio of hydrogen atoms to all other atoms is at least 2:1, which process comprises 1. purifying the deuterium-containing source material so as to remove contaminants therefrom, 2. contacting the purified source material stream with a stream of hydrogen containing less than a normal abundance of deuterium and a hydrogenation-dehydrogenation catalyst at a temperature from about 400° to about 1800°F., a pressure from about atmospheric up to about 10,000 psia and a feed rate of source material, in the vapor phase, plus hydrogen from about 1,000 to about 100,000 standard volumes of gas per hour per volume of catalyst with the volume ratio of hydrogen to source material being from about 5:1 to about 0.5:1 in a first transfer stage thereby transferring deuterium from the source material stream to the hydrogen stream and producing a first deuterium-enriched hydrogen stream and a first source material stream of reduced deuterium content, 3. separating the first deuterium-enriched hydrogen stream from the first source material stream of reduced deuterium content, 4. fractionating the first deuterium-enriched hydrogen stream into a substantially deuterium-free hydrogen fraction and a superenriched deuterium fraction, 5. combining the first source material stream of reduced deuterium content from step (3) and the substantially deuterium-free hydrogen fraction from step (4), 6. passing such combined stream into contact with a hydrogenation-dehydrogenation catalyst at a temperature from about 400° to about 1800°F., a pressure from about atmospheric up to about 10,000 psia and a feed rate of source material, in the vapor phase, plus hydrogen from about 1,000 to about 100,000 standard volumes of gas per hour per volume of catalyst with the volume ratio of hydrogen to source material being from about 5:1 to about 0.5:1, in a second transfer stage thereby producing a second hydrogen stream of enriched deuterium content but containing less than a normal abundance of deuterium and a second source material stream of further reduced deuterium content, 7. separating the second hydrogen stream of enriched deuterium content from the second source material stream of further reduced deuterium content, 8. passing the second hydrogen stream containing less than a normal abundance of deuterium from step (7) to the first transfer stage of step (2), 9. contacting the superenriched deuterium fraction from step (4) with a catalyst effective to equilibrate such fraction at a temperature from about room temperature up to about 300°F.

10. subjecting the equilibrated, superenriched deuterium fraction to a second fractionation to provide a deuterium-enriched hydrogen fraction and a substantially pure deuterium fraction, and 11. recycling the deuterium-enriched hydrogen fraction to the first fractionation step and recovering the substantially pure deuterium fraction as product.

11. The process of claim 10 wherein the source material is natural gas.

12. The process of claim 10 wherein the source material is methane.

13. A process for producing heavy water of high concentration which comprises reacting the substantially pure deuterium product from claim 2 with substantially pure oxygen thereby producing substantially pure heavy water ($D_2O$).

14. A process for producing heavy water of high concentration which comprises reacting the substantially pure deuterium product from claim 10 with substantially pure oxygen thereby producing substantially pure heavy water ($D_2O$).

* * * * *